Patented Aug. 14, 1945

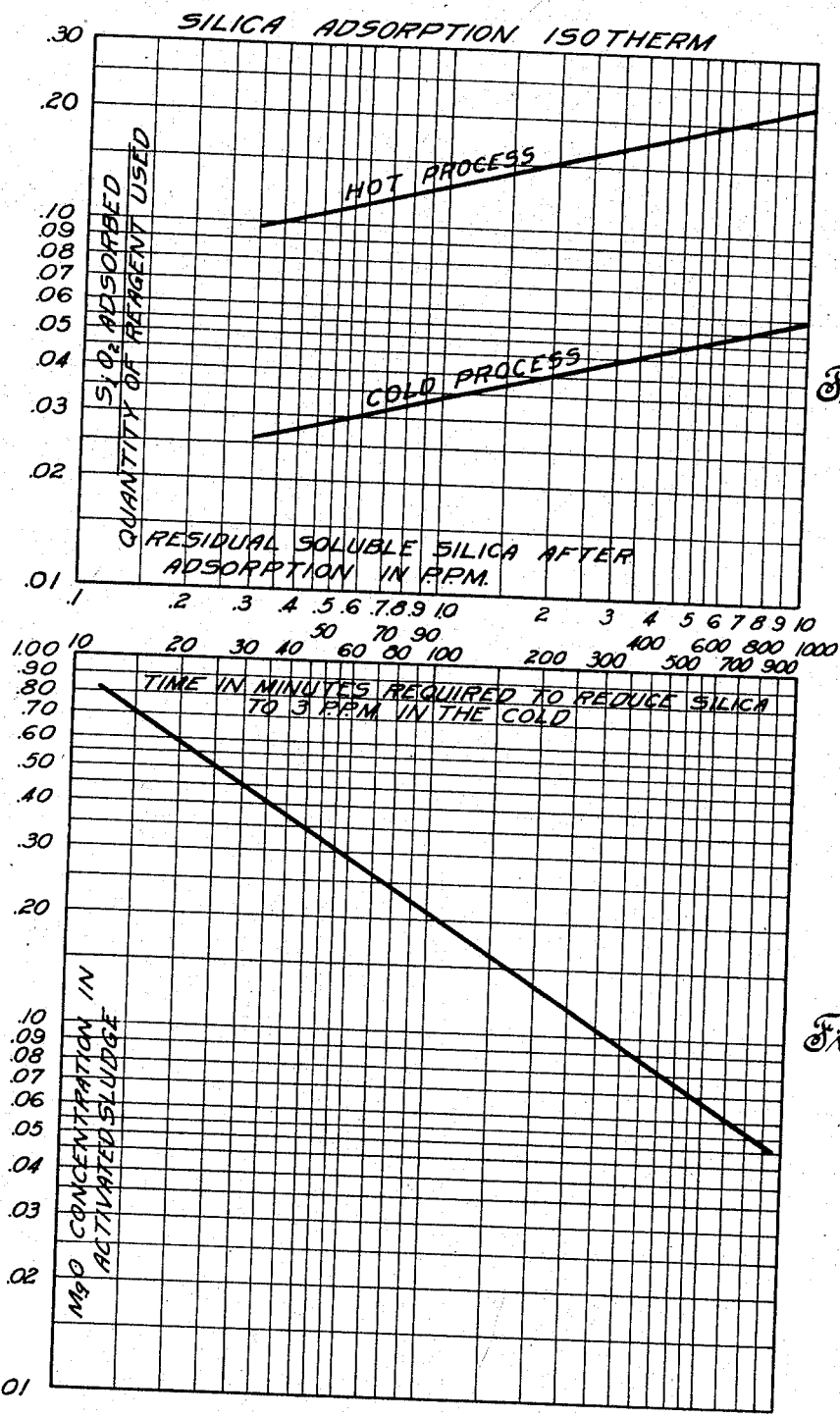

2,382,902

UNITED STATES PATENT OFFICE 2,382,902

BOILER FEED-WATER TREATMENT PROCESS

Thomas L. Pankey, Wauwatosa, and Carroll E. Imhoff, Calhoun Farms, Wis., assignors to Allis-Chalmers Manufacturing Company, Milwaukee, Wis., a corporation of Delaware Application May 7, 1941, Serial No. 392,218

8 Claims. (Cl. 210—23)

This invention relates to improvements in methods for removing impurities from water and particularly to the treatment of the water supplied to a steam boiler and from which the silica content must be removed.

The water supplies for steam generation are contaminated by various impurities which are concentrated by evaporation of the water. The impurities form scale which deposits on the heat transfer surfaces of the boiler and also form a sludge which gathers in the so-called mud drum of the boiler. The character and composition of the impurities vary, depending on the type of materials with which the water had come into contact, particularly the inorganic materials which are dissolved or suspended in the water. The most frequently encountered impurities in boiler feedwater are calcium and magnesium compounds which produce the so-called permanent and temporary hardness in water and silicon dioxide which produces a particularly hard and tenacious scale when deposited on boiler heat transfer surfaces. Calcium and magnesium can be removed from water by any one of several known methods of softening, but none of the softening materials and methods known at the present time is successful to even a commercial degree in removing silica from boiler feedwater. The problem of silica removal from boiler feedwater is becoming increasingly important in modern high pressure and high temperature power plants which require a large quantity of makeup water. Decreased efficiency of the steam and power generating equipment and direct financial losses due to the cost of and the time lost in interruptions of operation for the elaborate chemical and mechanical cleaning operations necessary to remove the dense and hard silica deposits, are often the direct result of using boiler feedwater having a high silica content.

Silica is one of the most widespread of natural compounds and is soluble in water. All natural waters, therefore, contain some silica in solution or in a suspended or colloidal form. The suspended or colloidal silica can be removed by coagulated followed by settling or filtration or by a combination of both such operations. Dissolved silica must, however, be removed by chemical or chemical-physical means. Chemical means for removing silica from solution in water have not proved successful because silicates are too soluble for removal by the precipitation methods usual in water softening, and the base exchange method is also ineffective in removing silica. It is well known, however, that the chemical-physical process of adsorption may be used for removing dissolved silica if a suitable adsorbent is used. It is known that magnesium oxide will adsorb silica in varying amounts depending upon the concentrations of the silica and the magnesium oxide, the temperature of the solution, and the density of the magnesium oxide. The prior art also discloses the use of various magnesium compounds, the use of magnesium oxide prepared in various ways and the use of magnesium hydroxide prepared in various ways in an attempt to secure the effective adsorption of silica.

Up to the present time a readily available form of magnesium and a method for its use in silica removal which would be sufficiently effective to warrant its use commercially have not been developed. It has been suggested that dolomitic limes (56% $CaCO_3$ and 44% $MgCO_3$) might be used as a source of magnesium oxide for silica removal. A number of independent investigations have, however, shown that many dolomitic limes are not thoroughly satisfactory as a source of magnesium oxide for silica removal. The present invention, however, relates to an improved process of treating water for removing dissolved silica therefrom through utilization of dolomites having particular characteristics and which are particularly effective for silica removal from water when properly prepared. To most efficiently utilize the present process, it is of importance to recognize the identifying characteristics of the several dolomites and to follow an exact procedure in their use, remaining within the several critical limits of use stated.

It is therefore an object of the present invention to provide an improved process for treating water with magnesium-containing lime or dolomitic lime for removing colloidal and dissolved silica from the water.

Another object of the invention is to provide an improved process for treating water with dolomitic limes wherein the effectiveness of the magnesium content of the limes for removal of silica from the water is increased.

Another object of the invention is to provide an improved process for treating boiler feedwater with a magnesium containing material for removing silica from such feedwater.

Another object of the invention is to provide an improved and commercially practical process for treating boiler feedwater with specified amounts of a selected dolomitic lime for removing silica therefrom.

Graphs are hereto attached and form a portion of the present specification to show, in Fig. 1, a silica adsorption isotherm applicable to the material and processes herein disclosed for removing silica from water. The material and processes are believed to be effective by adsorption and the results obtained have been plotted using logarithmic coordinates to convert parabolic curves into a straight line isotherm according to the theory relating to adsorption expressed by H. Freundlich (see article by Hassler, "Industrial and Engineering Chemistry," vol. 32, No. 5, pages 640–645); and Fig. 2 is a graph showing magnesium oxide concentration plotted in logarithmic coordinates, against time in minutes, by which it is possible to determine the MgO concentration required to reduce any given silica content to 3 P. P. M. in any required length of time.

In the process of adsorption of and by solids from liquids there are two characteristics which have a very important bearing upon the degree of adsorption which takes place per unit weight of adsorbent.

1. The degree of adsorption is highly dependent upon the extent of the surface of the adsorbent. Adsorption being a surface phenomenon, the highest degree of adsorption can be obtained when the greatest amount of surface is present. The extent of surface of a solid particle depends upon its state of subdivision. For example, a particle having cubic dimensions of 10 mm. to an edge offers a total surface of 6 square cm. If this same amount of material is pulverized so that the total number of particles becomes $10^{18}$, the total surface of the particles then becomes $6 \times 10^6$. This represents an increase in surface of one million times without increase in the total weight of solid material. In our process we increase the state of subdivision by recirculation of the sludge containing the adsorbing agent, the particles thus being broken up and offered to the solution again in a finer state of subdivision.

2. Adsorption is preferential. That is, magnesium hydroxide has a much stronger affinity for silica than has magnesium oxide, and an activated form of magnesium hydroxide has a greater affinity for silica than the unactivated magnesium hydroxide. Our technique consists in the selection and preparation of a dolomitic limestone which will yield a magnesium oxide which is readily hydrated and which has the maximum adsorptive affinity for silica. In addition to securing the most active form of magnesium hydroxide, we have discovered that a further activation takes place after a sufficient time is allowed for partial action between the adsorbed silica and the magnesium hydroxide. We have been able to recognize this material, study its activity in regard to the adsorption of soluble silica, and reproduce such activity. The activated form of magnesium hydroxide has a very fast action rate, which can be seen by the results as shown in the accompanying graph. We have prepared activated forms of magnesium hydroxide from dolomitic quicklime, magnesium hydroxide and magnesium oxide by putting such magnesium compounds into reaction with either silica gel, neutralized sodium silicate, or finely divided colloidal silica, in a form such as diatomaceous earth or calcium silicate.

The conditions for the activation of the magnesium hydroxide in our present process are as follows:

1. Magnesium oxide, carbonate or hydroxide is brought into aqueous contact with an available form of silica, such as sodium silicate, silica gel, or finely divided solid silica or partially soluble silicate, such as calcium silicate;

2. The above described reagents are allowed to react at a temperature preferably 212° F. for one to three hours. A longer time favors more complete formation of the active form;

3. The alkalinity during the reaction is adjusted so that the hydroxide present in solution does not exceed 100 P. P. M. expressed as calcium carbonate.

The characteristics of the activated magnesium hydroxide are as follows:

1. The ratio of $SiO_2$ to MgO in this material is much higher than is formed by straight adsorption of silica on unactivated magnesium hydroxide;

2. The activated form shows no X-ray lines for magnesium hydroxide. The unactivated form shows magnesium hydroxide. In the process of activation the X-ray lines for magnesium hydroxide gradually fade out, showing that the process is gradual and that time is an important factor in securing the most highly activated form;

3. The rate of silica adsorption is much faster with the activated form than with the unactivated magnesium hydroxide;

4. Although temperature favors the action, reactivity in the cold remains quite high.

When our process is applied to hot process softeners, the recirculation of sludge provides conditions under which the activation of magnesium hydroxide can take place. By recirculation, the magnesium hydroxide with its adsorbed silica is kept in the system for a considerable length of time—at least long enough for some further activation to take place. The activated magnesium hydroxide is returned again and again to the reaction tank to adsorb additional silica with each cycle, and thereby produces a more efficient adsorption of silica per unit of magnesium hydroxide used. Recirculation, in addition to increasing the amount of surface by dispersion of the magnesium hydroxide, also increases the available surface by increasing the total concentration of the magnesium hydroxide in suspension.

The graph in Fig. 2 was drawn on log-log paper from data which were secured from an activated form of magnesium hydroxide prepared from dolomitic oxide and sodium silicate. In obtaining the graphed data, all conditions were comparable except for magnesium hydroxide concentration. The degree of activation of magnesium was the same, and the same degree of agitation was given in all cases. The graph shows that the length of time required to reduce a given silica content to 3 P. P. M. depends upon the concentration of the magnesium oxide in suspension, and permits determination of the magnesium oxide concentration required to reduce any given soluble silica content down to 3 P. P. M. in any required amount of time.

A dolomite from the areas producing a stone which is burnable to produce what is known in the plastering art as a "fat lime" is used commercially. The chemical composition of the stone prior to burning is a double carbonate usually written as $CaCO_3.MgCO_3$ and is approximately 56% $CaCO_3$ and 44% $MgCO_3$ which is the composition of substantially all dolomites.

It has been found that the most effective material is made from dolomite free from significant total amounts of impurities and particularly from dolomite free from strontium sulfate, calcium sulfide and calcium fluoride. The material should slake to below 1% residue on 100 mesh screen when slaked to a putty. The dolomites occurring in both Ohio and Wisconsin are suitable sources of material if sufficiently pure and properly prepared. It has been found that Wisconsin dolomites are more stable under normal handling than Ohio dolomites and are otherwise preferable because of their faster operating characteristics. As between various Wisconsin dolomites, it has been found that material obtained from the vicinity of Eden, Wisconsin, most closely meets the stated conditions.

It has been found from our experience that the material is most active in removing silica if made from the Marblehead type of dolomite and subjected only to a medium burning that is between the temperature limits of 1800 to 2400° F. to avoid overburning of the magnesium compounds which burn first. To obtain maximum adsorption, care must be taken that the burned limestone does not become either air or water slaked by more than 1% prior to its use in the silica removing process. The burning should preferably be with wood as fuel to avoid formation of sulfur and particularly sulfate compounds from sulfur in coal.

We have found it is possible to select stones from the quarry face which have varying degrees of silica adsorbing properties when burned and tested under identical conditions. For example, the quarry face of the Eden, Wisconsin, deposit is divided into three distinct types of strata according to the depth of deposit. These are designated as top portion, middle portion and bottom portion. X-ray studies of the unburned stone and burned stone show marked differences in crystal sizes of the constituents. These comparisons may be tabulated as follows:

|  | Top strata | Middle strata | Bottom strata |
|---|---|---|---|
| Crystal size of stone | Non-uniform wide range | Non-uniform wide range | Rather uniform fairly large. |
| Orientation of crystals | Marked | Some | Small amount. |
| Crystal size of CaO in burned stone | Intermediate | Largest | Smallest. |
| Crystal size of MgO in burned stone | Largest | Smallest | Intermediate. |
| Friability | Intermediate | Least | Greatest. |
| Silica adsorption | Good | Poorest | Best. |

Material from the bottom strata gives greatest silica reduction and is characterized by fairly large crystals of rather uniform size. Burning produces calcium oxide of large crystal size. This bottom strata is called Marblehead limestone, and has the lowest porosity known for limestone. (Building and Ornamental Stones, Buckley, Wisconsin Geological Survey Bulletin, No. IV, pages 335–336.) The average specific gravity is the highest of any stone tested in the State of Wisconsin and it possesses a crushing strength almost equal to that of granite.

The method of using activated magnesium lime depends upon whether the process is carried out at ordinary temperatures or at boiling temperatures; that is, whether the process is cold process or hot process. In the case of silica removal in conjunction with hot process softening, the activated magnesium lime is added into the chemical tank along with any other chemicals which are required for softening, such as soda ash, sodium bicarbonate, or hydrated lime. It is not necessary to preslake the activated magnesium lime, but all the necessary chemicals are mixed together with water to form a slurry of suitable concentration, such that the proportioning device will operate to deliver to the sedimentation or precipitation tank, which may be a treating tank of standard design well known in the art, the proper quantities of magnesium lime and other chemicals as have been predetermined for softening and silica removal. The chemicals and magnesium lime contained in the slurry are admitted to the top of the sedimentation tank along with the heated raw water. The softening reactions and adsorption begin to take place, and the precipitates begin to settle out into the bottom of the sedimentation tank in the form called softener sludge.

The magnesium oxide contained in the magnesium lime begins to hydrate as soon as it comes into contact with the hot water and, upon hydration, the adsorption of silica begins. The magnesium oxide, however, settles to the bottom of the sedimentation tank before it has been completely hydrated, and before all its silica adsorbing capacity has been expended. To make use of the unexpected and now greatly increased silica adsorbing capacity, the sludge is pumped back to the top of the softener by means of a recirculation pump. Longer contact with the hot water, and complete hydration of the magnesium oxide is thus obtained. The amount of recirculation is equivalent to three to ten percent of the capacity of the sedimentation tank. The softened water remains in contact with the recirculated sludge for about one hour, and then is separated from the precipitate by an arrangement in the precipitation tank or softener which allows the water to flow upward, while the solid particles continue to flow downward.

A small amount of solids remaining suspended in the partially clarified water are removed on a filter. The material carried over on to the filters also has the remarkable property of adsorbing silica in amounts much greater per unit weight than the material present in the softener sedimentation tank. In operation, our method of silica removal is made more effective by arranging the cycle of filter operation so as to build up and maintain on the filter bed a layer of sludge which has been found to have a highly increased silica adsorbing capacity, particularly in the range of 10 P. P. M. or less of silica where removal is most difficult. The layer of highly adsorbent material is maintained on the filter bed by increasing the concentration of sludge in the softener to insure that a small amount will be carried over to the filters, and by decreasing the frequency and degree of completeness of filter backwashing. It is also desirable to retain the adsorbing material from the filters in the system by backwashing the filters to the softener sedimentation tank.

In the cold process softener the activated magnesium lime is first completely hydrated or slaked by mixing with water and bringing up to a temperature of about 210° F., and keeping it up to such temperature for two or three hours. The slaked magnesium lime is then mixed with the other chemicals, such as soda ash, sodium bicarbonate, and hydrated lime in the chemical mixing tank and which are required in the softening process. The mixture is admitted to the cold process softener, which must have provision for forming a concentrated sludge bed of activated magnesium lime, through which the water must flow and remain in intimate contact for as long a time as possible. The adsorption at low temperature is much slower and less complete than at boiling temperatures, and it is necessary to take the above special steps to increase the sludge concentrations to a value much higher than attained in hot process softening.

The silica adsorption in both processes is dependent first upon the formation of magnesium hydroxide. The efficiency may be considerably increased if conditions are maintained favorable to the formation of the activated form of magnesium hydroxide, which we have described, due to the reaction of magnesium hydroxide and adsorbed silica when allowed to age at temperatures near the boiling point. It has been found that silica removal with magnesium lime is most effective in the pH range 9.4 to 11 which is usual in lime-soda softening.

The quantity of magnesium lime introduced into any given water is determined by the initial silica content of the water and the reduction desired in such silica content. The general method of determining quantities of materials required for both silica removal and water softening is as follows:

*General method of calculation*

A. Make a raw water analysis to include:
  Calcium as $CaCO_3$ (CaH or calcium hardness)
  Magnesium as $CaCO_3$ (MgH or magnesium hardness)
  Total alkalinity as $CaCO_3$ (M or methyl orange alkalinity)
  Total hardness as $CaCO_3$ (H or total hardness)
  Soluble silica
B. Decide on the amount of silica residue permissible in the treated water.
C. Determine the amount of magnesium lime required to reduce the silica content to the permissible residue, as follows:
  (a) Silica to be removed is the difference between the initial and the final desired silica content;
  (b) Refer to the silica adsorption isotherm in Fig. 1 to obtain the ratio of silica adsorbed to reagent used;
  (c) Determine the magnesium dosage by dividing the value found in (a) by the value found in (b);
  (d) Determine the calcium required for softening by the following equation:
    (magnesium hardness plus total alkalinity) $\times .8$ = hydrated lime required
    (.8 is the factor for conversion of calcium carbonate to commercial calcium hydroxide)
  (e) Determine required residual lime dosage by subtracting lime requirement furnished by the magnesium lime from the total lime requirement.
    (magnesium lime has 77% the softening value of hydrated calcium lime)

Two specific examples are given below, the first example being a water in which the calcium oxide content of the magnesium lime, in the quantity required for the desired silica removal, is not sufficient for softening of the water, and the second example being a water in which the calcium oxide content of the magnesium lime, in the quantity required for the desired silica removal, exceeds the lime required for softening of the water:

*Specific example when calcium in reagent is not sufficient for softening*

A. Calcium _____ 200 P. P. M. (CaH)
  Magnesium _____ 150 P. P. M. (MgH)
  Total alkalinity _____ 175 P. P. M. (M)
  Total hardness _____ 350 P. P. M. (H)
  Soluble silica _____ 15 P. P. M.
B. A silica residue of not more than 2 P. P. M. of soluble silica is permissible.
C. (a) 15−2=13 P. P. M. of silica is to be removed.
  (b) Referring to the isotherm, for 2 P. P. M. of permissible residual silica, the ratio is .155.
  (c) Ratio of (a) to (b) or 13 to .155 is 84 P. P. M. of magnesium dosage required.
  (d) MgH plus M (or 150 plus 175) $\times .8$ = 270 P. P. M. of total calcium lime requirement for softening.
    Calcium lime requirement to complete the softening is 270−65=205 P. P. M.

*Specific example when calcium in reagent exceeds requirement for softening*

A. Calcium _____ 50 P. P. M. (CaH)
  Magnesium _____    P. P. M. (MgH)
  Total alkalinity _____ 50 P. P. M. (M)
  Total hardness _____ 50 P. P. M. (H)
  Soluble silica _____ 13 P. P. M.
B. A silica residue of not more than 2 P. P. M. of soluble silica is permissible.
C. (a) 13−2=11 P. P. M. of silica is to be removed.
  (b) Referring to the isotherm, for 2 P. P. M. of permissible residual silica, the ratio is .155.
  (c) Ratio of (a) to (b) or 11 to .155 is 71 P. P. M. of magnesium dosage required.
  (d) MgH plus H (0 plus 50) $\times .8$ = 40 P. P. M. of total calcium lime required for softening.
  (e) Magnesium dosage furnishes 77% of 71 or 55 P. P. M.
    This is 15 P. P. M. more than total calcium lime requirement.
    15 P. P. M. excess calcium lime supplied must be taken up by sodium bicarbonate.
    $15 \times 1.68 = 25$ P. P. M. of sodium bicarbonate required to neutralize the excess lime. (1.68 is the factor for conversion of calcium carbonate to sodium bicarbonate.)

The present material and processes in practical use have shown that the quality of water required for modern high pressure steam generation can be readily obtained thereby. Better coagulation of suspended solids is obtained, thus securing a better clarification with a decreased load on the filters. Since a reduction in silica content to at least 10 P. P. M. is necessary to avoid major difficulties arising from the presence of silica in water and since it is impractical commercially to attempt reduction of the silica content of water below .8 P. P. M. because of the disproportionate increase (indicated in the isotherm chart of Fig. 1) in the amount of lime required to attain reduction of silica content below the latter figure, the ordinarily desired range in commercial practice is 10 P. P. M. to .8 P. P. M. of silica in the treated water. Referring to the isotherm chart (Fig. 1), it will be noted that for 10 P. P. M. of residual silica the ratio of $SiO_2$ adsorbed to the quantity of reagent used is .225, or 4.4 parts of magnesium bearing lime per part of silica removed; and for .8 P. P. M. of residual silica, the ratio of $SiO_2$ adsorbed to the quantity of reagent used is .125, or 8 parts of magnesium bearing lime per part of silica removed. The practical results obtained from the present material and process are best illustrated in the following tabulation:

| User | Process | Prior treatment | Quantity of present material used per 1000 gal. | Silica content | | |
|---|---|---|---|---|---|---|
| | | | | Initial | Prior effluent | Present effluent |
| | | | Pounds | P. P. M. | P. P. M. | P. P. M. |
| I | Hot | $FeSO_4$ | .75 | 46 | 30 | 12 |
| | | $Al_2(SO_4)_3$, $ZnSO_4$ | 1.5 | | | 2.5 |
| II | do | $Na_2(Al_2O_4)$, $Fe_2(SO_4)_3$ | 1.5 | 23 | 2 | .8 |
| III | do | None | 1.32 | 20 | | 3 |
| IV | Cold | $Fe_2(SO_4)_3$ | 2.62 | 16 | 1.5 | 3 |
| V | Hot | None | .65 | 16 | 11 | 2 |
| VI | do | do | .46 | 7 | (¹) | 1.8 |
| VII | do | do | .42 | 10 | | 3.4 |

¹ New plant.

It will be seen from the above specification that the absorbing capacity of magnesium hydroxide is greatly increased by applicants' activation. Such activation may be either a pre-treatment using a silicon compound or may be produced in the process of use by recirculation of a sludge mixture of magnesium hydroxide and silica, as may be most convenient. The activated magnesium hydroxide is obtained from a cheap and readily available material and the calcium content of the material is useful in the usual lime-soda softening process and therefore fully employed. The most effective material is produced if the raw material conforms to the standards above stated. This material of increased effectiveness is particularly useful where the calcium requirement for softening is less than is automatically supplied by meeting the magnesium requirement for silica removal. The material is easily controlled and its effect is stable throughout the entire usual range of softening operations. The care required in burning the dolomite is easily exercised in commercial kilns and does not increase commercial costs. The process of use requires only a slight addition to the usual lime-soda softening equipment and relatively slight changes from normal in the operation of such equipment. An additional by-product result of the present silica removal method is a marked stabilization of the softening action produced by the magnesium floc, thus reducing the total solids remaining in the treated water and also increasing the capacity of the softening equipment. The duty required from the filters is very considerably decreased due to the volume and density of the magnesium floc which settles out in the sedimentation tank and thus reduces the required frequency of backwashing which incidentally increases the degree of silica removal and the effectiveness of the filters without loss of head. And finally, the results above stated are obtained with unskilled men and are consistently attained.

It is claimed and desired to secure by Letters Patent:

1. The process of treating water for removing dissolved silica therefrom, which comprises, passing the water through a precipitation tank having an outlet spaced from the inlet thereof, adding to the water in the upper portion of said tank from 4.4 to 8 parts of a magnesium bearing quicklime per part of dissolved silica to be adsorbed to form a sludge within said tank, allowing the sludge to precipitate through the water, maintaining a substantially continuous dispersion of precipitating sludge through the water within said tank by recirculating at least some of the precipitated sludge to the upper portion of said tank, and maintaining an accumulation of sludge in filtering relationship with respect to the water being discharged from said tank.

2. The process of treating water for removing dissolved silica therefrom, which comprises, passing the water through a precipitation tank having an outlet spaced from the inlet thereof, adding to the water in the upper portion of said tank from 4.4 to 8 parts of a magnesium bearing quicklime per part of dissolved silica to be adsorbed to form a sludge within said tank, allowing the sludge to precipitate through the water and form a sludge bed in a lower portion of said tank, maintaining a substantially continuous dispersion of precipitating sludge through the water within said tank by withdrawing at least some sludge from said bed and delivering the same into the upper portion of said tank, and maintaining an accumulation of sludge in filtering relationship with respect to the water being discharged from said tank.

3. The process of treating water for removing dissolved silica therefrom, which comprises, passing the water through a precipitation tank having an outlet spaced from the inlet thereof, adding to the water in the upper portion of said tank from 4.4 to 8 parts of a magnesium bearing quicklime per part of dissolved silica to be adsorbed to form a sludge within said tank, allowing the sludge to precipitate through the water, maintaining a substantially continuous dispersion of precipitating sludge through the water within said tank by recirculating at least some of the precipitated sludge to the upper portion of said tank, maintaining the alkalinity of the water being treated below 100 P. P. M. calculated as calcium carbonate by addition of an alkali in suitable amounts, and maintaining an accumulation of sludge in filtering relationship with respect to the water being discharged from said tank.

4. The process of treating water for removing dissolved silica therefrom, which comprises, passing the water through a precipitation tank having an outlet spaced from the inlet thereof, adding to the water in the upper portion of said tank from 4.4 to 8 parts of a magnesium bearing quicklime per part of dissolved silica to be adsorbed to form a sludge within said tank, allowing the sludge to precipitate through the water, maintaining a substantially continuous dispersion of precipitating sludge through the water within said tank by recirculating at least some of the precipitated sludge to the upper portion of said tank, maintaining the alkalinity of the water being treated within the pH range of 9.4 to 11 by addition of an alkali in necessary amounts, and maintaining an accumulation of sludge in filtering relationship with respect to the water being discharged from said tank.

5. The process of treating water for removing dissolved silica therefrom, which comprises, passing the water through a precipitation tank having an outlet spaced from the inlet thereof, adding to the water in the upper portion of said tank from 4.4 to 8 parts of a magnesium bearing quicklime per part of dissolved silica to be adsorbed to form a sludge within said tank, allowing the sludge to precipitate through the water and form a sludge bed in a lower portion of said tank, maintaining a substantially continuous dispersion of precipitating sludge through the water within said tank by withdrawing at least some sludge from said bed and delivering the same to the upper portion of said tank, maintaining an accumulation of sludge in filtering relationship with respect to the water being discharged from said tank, and backwashing the filtering sludge bed to said precipitation tank.

6. The process of treating water for removing dissolved silica therefrom, which comprises, passing the water through a precipitation tank having an outlet spaced from the inlet thereof, adding to the water in the upper portion of said tank from 4.4 to 8 parts of a magnesium bearing quicklime per part of dissolved silica to be adsorbed to form a sludge within said tank, allowing the sludge to precipitate through the water, maintaining a substantially continuous dispersion of precipitating sludge through the water within said tank by recirculating sludge in the amount of 3 to 10% of the capacity of said precipitation tank to the upper portion of said tank, and maintaining an accumulation of sludge in filtering relationship with respect to the water being discharged from said tank.

7. The process of treating water for removing dissolved silica therefrom, which comprises, passing the water through a precipitation tank having an outlet spaced below the inlet thereof, adding to the water in the upper portion of said tank adjacent said inlet from 4.4 to 8 parts of a magnesium bearing quicklime per part of dissolved silica to be adsorbed to form a sludge within said tank, allowing the sludge to precipitate through the water, maintaining a substantially continuous dispersion of precipitating sludge through the water within said tank by recirculating at least some of the precipitated sludge from the lower to the upper portion of said tank, and maintaining an accumulation of sludge in filtering relationship with respect to the water being discharged from said tank.

8. The process of treating water for removing dissolved silica therefrom, which comprises, passing the water through a precipitation tank having an outlet spaced from the inlet thereof, slaking from 4.4 to 8 parts of a magnesium bearing quicklime per part of dissolved silica to be adsorbed, adding the slaked lime to the water in the upper portion of said tank to form a sludge therein, allowing the sludge to precipitate through the water, maintaining a substantially continuous dispersion of precipitating sludge through the water within said tank by recirculating at least some of the precipitated sludge to the upper portion of said tank, and maintaining an accumulation of sludge in filtering relationship with respect to the water being discharged from said tank.

THOMAS L. PANKEY.
CARROLL E. IMHOFF.